United States Patent
Chou et al.

(10) Patent No.: US 8,917,287 B2
(45) Date of Patent: Dec. 23, 2014

(54) IMAGE DISPLAY METHOD FOR DIGITAL MANIPULATOR

(71) Applicant: Delta Electronics, Inc., Taoyuan Shien (TW)

(72) Inventors: Shih-Min Chou, Taoyuan Shien (TW); Chien-Chih Chiu, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 14/248,977

(22) Filed: Apr. 9, 2014

(65) Prior Publication Data

US 2014/0218401 A1 Aug. 7, 2014

Related U.S. Application Data

(62) Division of application No. 12/832,544, filed on Jul. 8, 2010, now abandoned.

(51) Int. Cl.
| | |
|---|---|
| G09G 5/00 | (2006.01) |
| G09G 5/22 | (2006.01) |
| G09G 5/36 | (2006.01) |
| G09G 5/397 | (2006.01) |
| G06F 3/0489 | (2013.01) |
| G06F 9/44 | (2006.01) |
| G06F 3/023 | (2006.01) |

(52) U.S. Cl.
CPC .................. *G09G 5/397* (2013.01); *G09G 5/00* (2013.01); *G06F 3/0489* (2013.01); *G06F 9/44* (2013.01); *G06F 3/0238* (2013.01); *G09G 2340/10* (2013.01)

USPC ........ 345/619; 345/629; 345/634; 345/440.1; 345/156; 345/545

(58) Field of Classification Search
None
See application file for complete search history.

(56) References Cited

U.S. PATENT DOCUMENTS

| | | | | |
|---|---|---|---|---|
| 5,389,868 | A * | 2/1995 | Mikami et al. | 318/632 |
| 6,335,870 | B1 * | 1/2002 | Sakurai | 363/34 |
| 6,362,813 | B1 * | 3/2002 | Worn et al. | 345/169 |
| 6,438,446 | B1 * | 8/2002 | Trachier | 700/180 |
| 6,567,983 | B1 | 5/2003 | Shiimori | |
| 8,633,941 | B2 * | 1/2014 | Wada et al. | 345/589 |
| 2003/0192746 | A1 * | 10/2003 | Suzuki | 187/391 |
| 2005/0111676 | A1 * | 5/2005 | LeBlanc et al. | 381/120 |
| 2006/0107031 | A1 | 5/2006 | Kouno et al. | |
| 2007/0051792 | A1 | 3/2007 | Wheeler et al. | |
| 2008/0157600 | A1 * | 7/2008 | Marlenee et al. | 307/66 |
| 2010/0271378 | A1 | 10/2010 | Low et al. | |
| 2012/0110747 | A1 * | 5/2012 | Yum et al. | 8/137 |

* cited by examiner

*Primary Examiner* — Maurice L McDowell, Jr.
*Assistant Examiner* — Donna J Ricks
(74) *Attorney, Agent, or Firm* — Muncy, Geissler, Olds & Lowe, P.C.

(57) ABSTRACT

A digital manipulator for an inverter and an image display method for the digital manipulator are disclosed. The digital manipulator is connected to and an external computer. The images used by the digital manipulator are edited by editing software in an external computer and are downloaded to LCM of the digital manipulator to display. The digital manipulator has a plurality of function buttons. Corresponding functions of the function buttons are assigned via editing software by a user. As a result, the digital manipulator is more flexible to use, and users are allowed to configure a digital manipulator based on own individual requests and operating habits.

9 Claims, 8 Drawing Sheets

IMAGE DISPLAY METHOD FOR DIGITAL MANIPULATOR

CROSS-REFERENCE TO RELATED APPLICATIONS

This application is a divisional application of U.S. application Ser. No. 12/832,544 filed on Jul. 8, 2010. The entire disclosure is incorporated herein by reference.

BACKGROUND OF THE INVENTION

1. Field of the Invention

The present invention relates to an inverter, in particular relates to a controller for controlling an inverter.

2. Description of Prior Art

In the field of industrial control products, operators utilize interfaces for controlling various electromechanics which makes interface media a critical part of design in electromechanics. In the present invention, the digital manipulator is developed to provide an interface media for controlling an inverter and for displaying inverter data.

In the current inverter market, Light Emitting Diode (LED) is utilized for displaying data of a digital manipulator. FIG. 1 is a schematic diagram of a prior art interface. A plurality of control buttons 11 of the prior art first manipulator 1 are used for configuring an inverter and switching display data. The first manipulator 1 retrieves various numeric values of the inverter and displays the numeric values via the LED 12. Furthermore, numeric values of specific data of the inverter are displayed by display lamps 13 underneath the LED 12 to inform users of the inverter status.

Nonetheless, the LED 12 is provided only for display numbers and is not capable of providing comprehensive inverter data. Accordingly, as the technology of Liquid Crystal Display (LCD) becomes popular and cost of a LCD continues to reduce, there are more and more inverter manufacturers introducing new models of digital manipulators equipped with a Liquid Crystal Module (LCM) for displaying more text data of an inverter.

FIG. 2 is another prior art interface schematic diagram. Another prior art second manipulator 2 has a plurality of control buttons 21, a LCM 22 and a plurality of function buttons (function key) 23. A plurality of control buttons 21 are used for configuring or controlling an inverter. The LCM 22 is used for displaying various data of an inverter. The function buttons 23 on the digital manipulator 2 respectively correspond to specific functions. Furthermore, the image of the LCM 22 has a plurality of label 23 correspondingly so as to inform users of the function buttons 23 respectively correspond to which functions.

Though, the second manipulator 2 displays comprehensive inverter data via the LCM 22. Yet, the display image is configured by manufactures in the factories. Users are allowed to receive the inverter data via the image by default. The function buttons 23 are provided for faster execution of specific functions. Yet, the corresponding functions are defined during productions. Users are not allowed to change the configurations. For example, one of the function buttons 23 is defined for displaying operation time of the inverter. However, when users do not desire to know operating time of the inverter, users are not allowed to reconfigure correspond functions of the function button 23. The button can not be used for providing useful function to the users.

In view of this, the present invention conducted through researches and developed a more flexible new digital manipulator wherein users edit the image of a digital manipulator based on user requests and define function buttons.

SUMMARY OF THE INVENTION

The major objective of the present invention is to provide an image display method for a digital manipulator. Users are allowed to configure functions a plurality of function buttons on a digital manipulator based on own individual requests.

Another major objective of the present invention is to provide an image display method for the digital manipulator. Users are allowed to edit images displayed on a digital manipulator.

In order to achieve the above mentioned objectives, in the present invention, a digital manipulator is connected to an external computer. Images used in the digital manipulator are edited via a editing software in an external computer and downloaded to the LCM of the digital manipulator to display. The digital manipulator has a plurality of function buttons. The users configure corresponding functions of the function buttons via the editing software.

Compare to prior art, one of the advantages of the present invention is users are allowed to edit the images of a digital manipulator with an external computer. Furthermore, users download edited images to the digital manipulator to display. Thus, user interface of the digital manipulator is edited to meet user requests. In addition, the innovative design provides flexibility different from conventional design thinking where function buttons are defined in production. Users are allowed to define corresponding functions of each function button respectively. Furthermore, the present invention provides a plurality of labels to be edited by editing software in the external computer. The labels correspond to the functions of each function button respectively. Thus users have the flexibility to operate on the digital manipulator according to individual operating habits.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
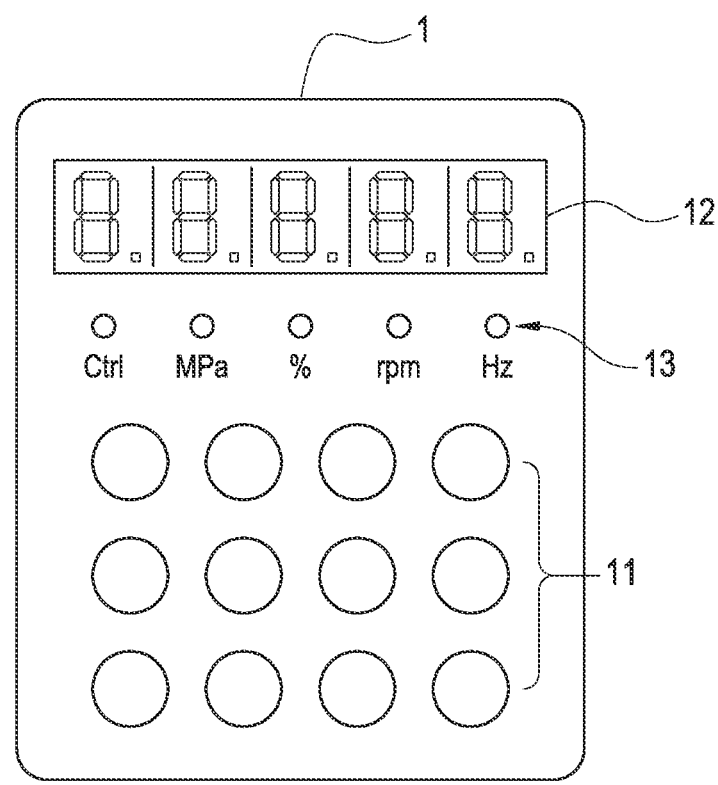
FIG. 1 is a schematic diagram of a prior art interface.
Figure 2:
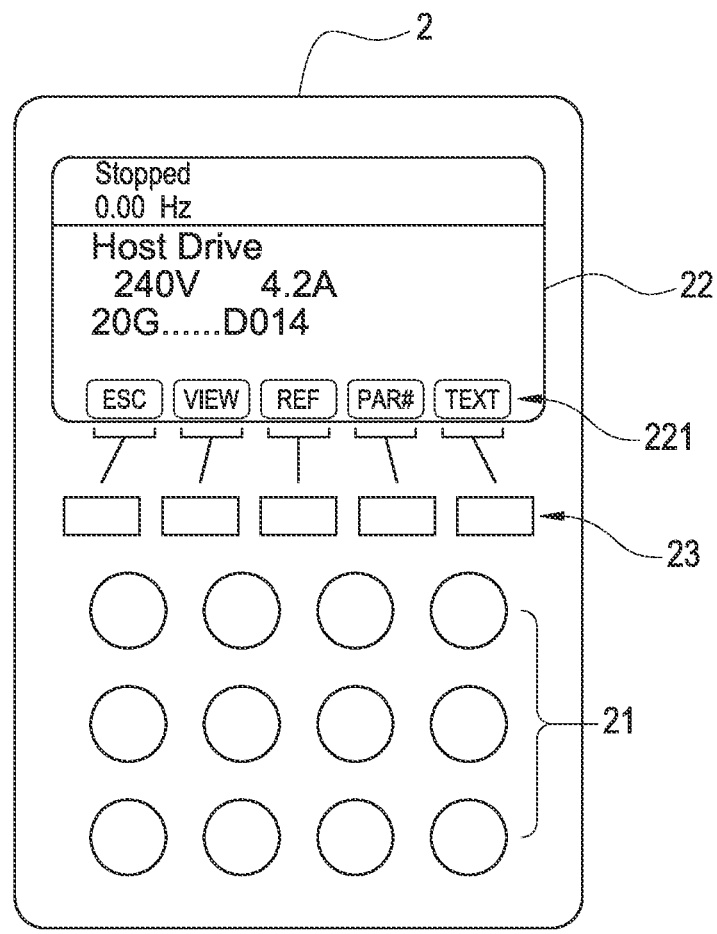
FIG. 2 is another prior art interface schematic diagram.
Figure 3A:
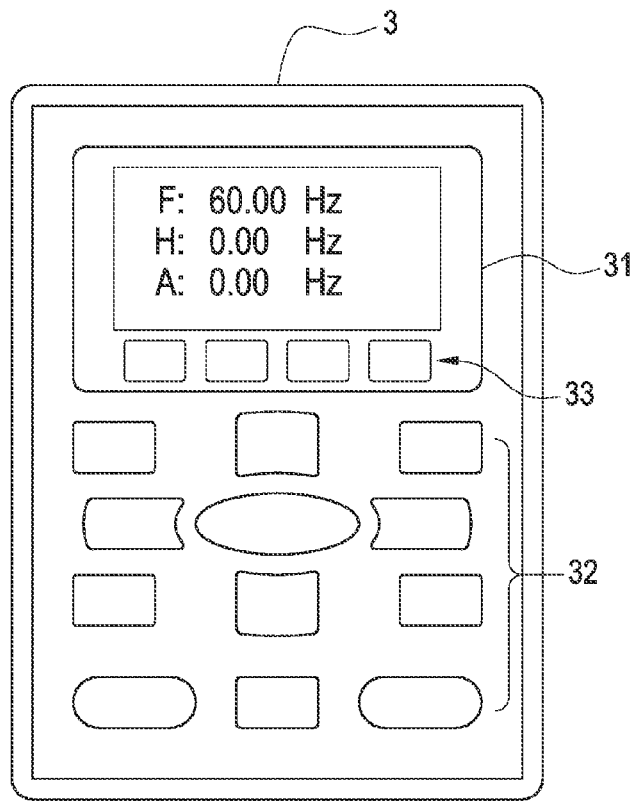
FIG. 3A is a schematic diagram of a digital manipulator of a preferred embodiment according to the present invention.

FIG. 3A is a schematic diagram of a digital manipulator of a preferred embodiment according to the present invention. The digital manipulator 3 of the present invention is electrically connected to an inverter (not shown in diagrams) for configuring and controlling the inverter as well as displaying various inverter data.

The digital manipulator 3 comprises a Liquid Crystal Module (LCM) 31, a plurality of control buttons (Control Key) 32, and a plurality of function buttons (Function Key) 33. Various information and data of the inverter are displayed on the LCM 31 via stationary graphics and/or dynamic graphics. The plurality of control buttons 32 are used for configuring and controlling the inverter, for example controlling functions of the inverter such as Run or Stop, configuring date and time, or configuring the inverter parameters. Users define functions of a plurality of function buttons 33 to assign different functions such as switching the image displayed on the LCM 31 to display speed current, voltage and frequency of the inverter. Or users instruct the digital manipulator 3 to enter into inverter parameter configuration mode, but the embodiment is not limited thereto. All functions related to the inverter, or all functions supported by the digital manipulator 3 can be defined by the plurality of function buttons 33.

Figure 3B:
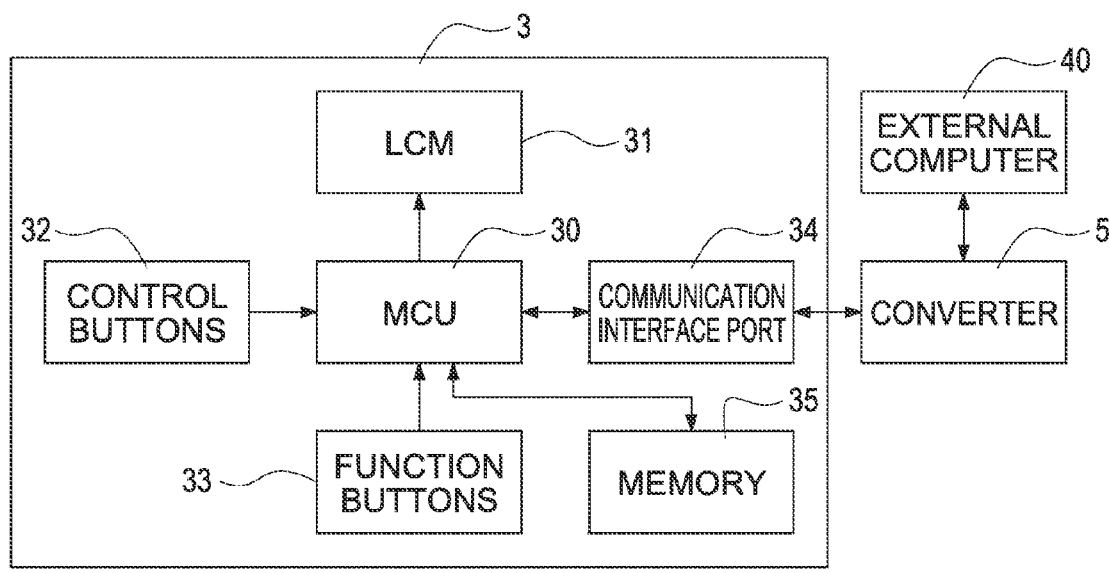
FIG. 3B is a block diagram of digital manipulator of a preferred embodiment according to the present invention.
Figure 4A:
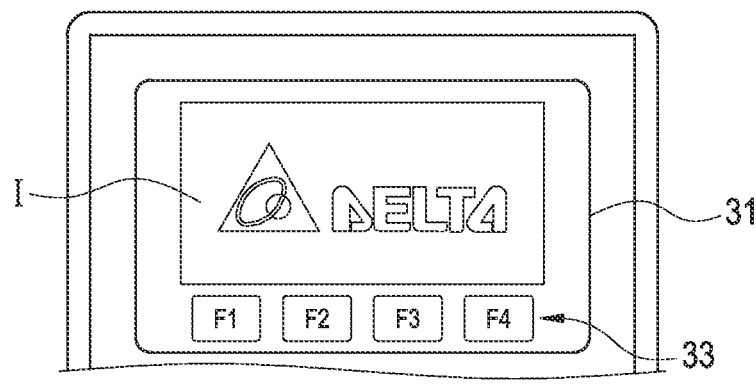
FIG. 4A is an image display schematic diagram of a preferred embodiment according to the present invention.
Figure 4B:
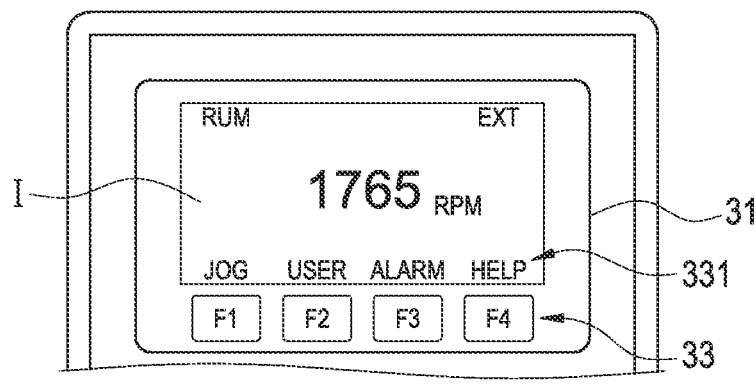
FIG. 4B is an image display schematic diagram of another preferred embodiment of the present invention.

FIG. 3B is a block diagram of digital manipulator of a preferred embodiment according to the present invention. The major technical characteristic of the present invention is that the digital manipulator 3 is connected to an external computer 40, wherein an image I (as shown in FIG. 4A or FIG. 4B) of the digital manipulator 3 is edited with the external computer 40 by users and downloaded to the digital manipulator 3 to display. As shown in the diagram, the LCM 31, the plurality of control buttons 32 and the plurality of function buttons 33 are electrically connected to Micro Control Unit (MCU) 30 installed in the digital manipulator 3. The MCU 30 is further electrically connected to a communication interface port 34. The MCU 30 receives and processes signals transmitted from the plurality of control buttons 32, the function buttons 33 and the communication interface port 34. Furthermore, the downloaded image I is transmitted to the LCM 31 to display. The digital manipulator 3 further has a memory 35 electrically connected to the MCU 30 for saving the downloaded image I.

As mentioned above, the external computer 40 has a Universal Serial Bus (USB) interface port and a communication interface port 34 of the digital manipulator 3 can be a RS-485 communication interface port 34. The digital manipulator 3 is electrically connected to the external computer 40 via USB to RS-485 converter 5 for downloading the image I, the embodiment is not limited thereto.

FIG. 4A is an image display schematic diagram of a preferred embodiment according to the present invention. In the diagram, the image I displayed on the LCM 31 is a power on image of the digital manipulator 3. The image I is edited on the external computer 40 by users and downloaded to the digital manipulator 3 to serve as the power on image displayed during power on process on the LCM 31. In the diagram, the trademark graphics of Delta Electronic Inc. is used as an example. Likewise, users edit the power on image depending on the user requests.

Next, FIG. 4B is an image display schematic diagram of another preferred embodiment of the present invention. In the diagram, the image I displayed on the LCM 31 is a main image of digital manipulator 3. In addition to the power on image, users also can edit a main image of the digital manipulator 3 with the external computer 40 (detailed in the following). Furthermore, when users edit the main image with the external computer 40, the users can also edit a plurality of labels 331 underneath the main image at the same time, wherein the plurality of label 331 correspond to functions of the function button 33 for reminding the users of specific function assigned to each function buttons 33. The plurality of labels 331 can be texts or icons.

As shown in the diagram, each function button 33 and each label 331 respectively defined as JOG, USER (user data), ALARM and HELP. When the users press one of the function buttons 33, the digital manipulator 3 switches the image to the designated image of the function button enabled or executes the defined designated function. The exact functions and images correspond to the function buttons 33 depend on individual user definition and not limited to the embodiment.

Figure 5A:
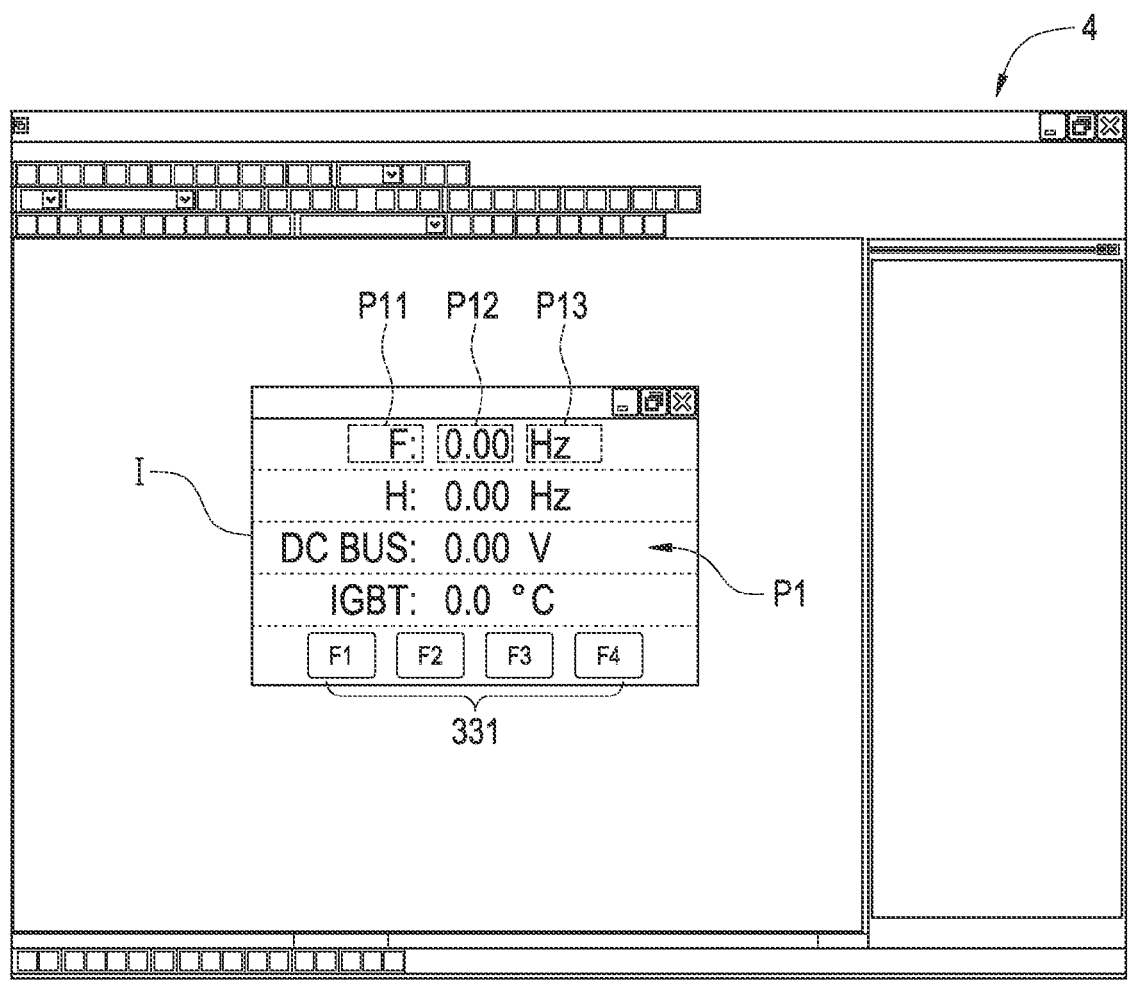
FIG. 5A is an image edit schematic diagram of a preferred embodiment according to the present invention.

FIG. 5A is an image edit schematic diagram of a preferred embodiment according to the present invention. Editing software 4 is installed in the external computer 40. The users edit the image I and the labels 331 via the editing software 4 with the external computer 40. Furthermore, users configure corresponding functions of the function buttons 33, wherein the editing software 4 can be standard editing software TPEditor for a text panel developed by Delta Electronics Inc but the embodiment is not limited thereto.

The editing software 4 is used for editing one or multiple graphic objects P1. The edited one or multiple the graphic objects P1 constitute the image I. The type of the graphic object P1 can be stationary graphics or dynamic graphics, and the image I can include graphic object P1 of one or multiple types such as stationary graphics or dynamic graphics, the embodiment is not limited thereto. For example, the power on image in the FIG. 4A is constituted by single type, the stationary graphics. For another example, the main image in FIG. 4B, the labels 331 are constituted respectively by four stationary graphics, wherein texts or icons are regarded as one fixed stationary graphics.

The image I shown in FIG. 5A is the main image displayed on the digital manipulator 3 and used for displaying various inverter data. The image I displays four data fields respectively constituted of a item graphic object P11, a numeric value graphic object P12 and an unit graphic object P13. Among which, the item graphic object P11 (i.e. F representing frequency shown in the diagram) and the unit graphic object P13 (i.e. Hz representing hertz shown in the diagram) are fixed stationary graphics, and the numeric value graphic object P12 (i.e., 0.00 shown in the diagram) is a dynamic graphics. When the image I is displayed on the digital manipulator 3, the digital manipulator 3 continually retrieves real-time numeric value related to frequency from the inverter. Furthermore, dynamic updates on the numeric value graphic object P12 is performed based on the real-time numeric value generating dynamic changes of the image I.

It should be noted that, the display means of the main image is fixed. The quantity and order of display fields used for displaying inverter data on the main image are not configurable in a conventional second manipulator 2. Nonetheless, in the present invention, users can edit the quantity and order of display fields in the image I. For example, there are four data fields in FIG. 5A. The quantity of data fields can be one, two, three, five or more depending on user requests. Furthermore, the height and width of each field are subject to change depending on the field quantity such that users view images at ease. The users can edit the plurality of labels 331 underneath the image I. The corresponding relations between each label 331 and the functions of each function buttons 33 is assigned after functions of each function buttons 33 are defined. In the present embodiment, quantity of the plurality of function buttons 33 and the plurality of labels 331 is four, but the embodiment is not limited thereto.

Figure 5B:
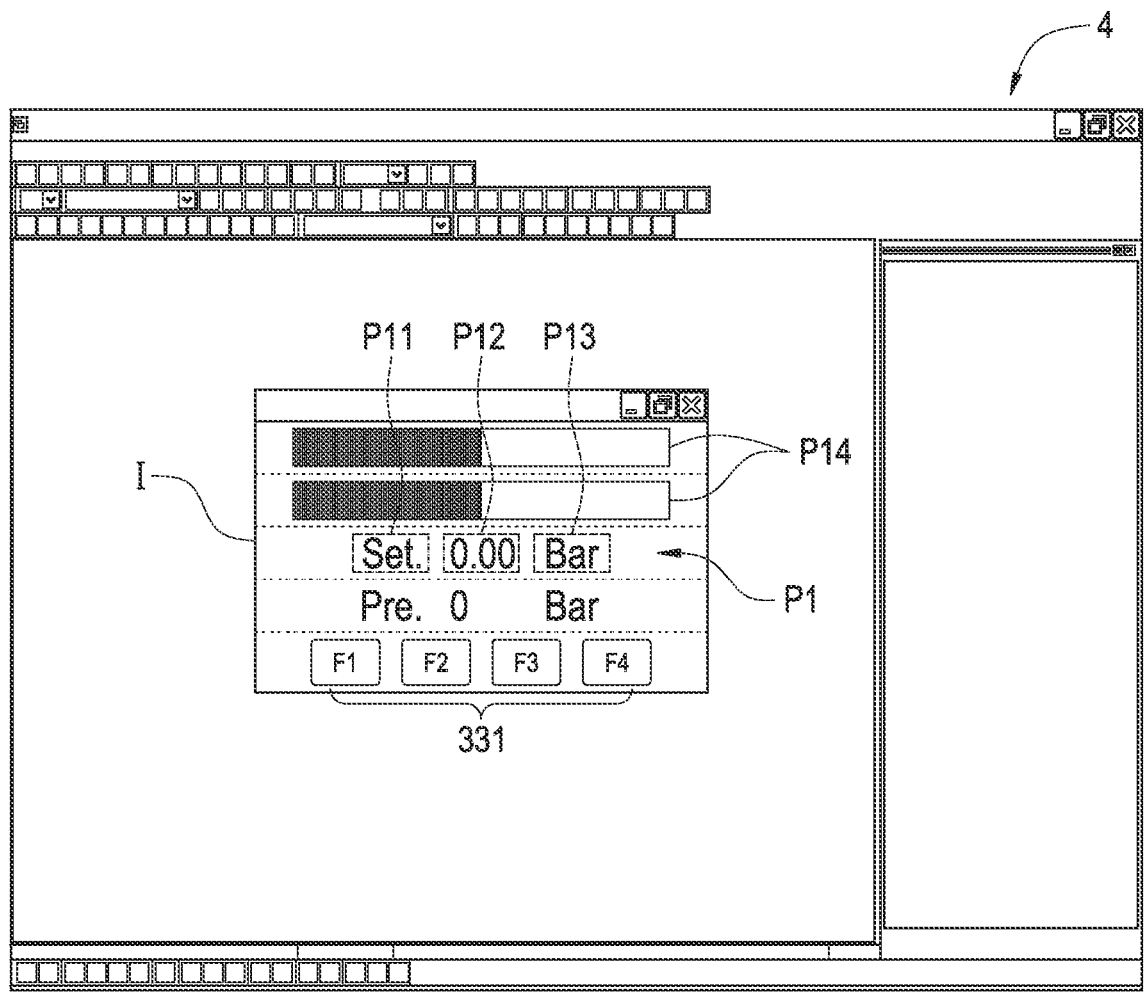
FIG. 5B is image edit schematic diagram of another preferred embodiment of the present invention.

As mentioned above, the users can design different means for displaying inverter data depending on various requests. FIG. 5B is image edit schematic diagram of another preferred embodiment of the present invention. In the image I in FIG. 5B, the first field and the second field are edited to be a bar chart object P14 whereas the third field and the fourth field are edited as the data fields constituted of the item graphic object P11, the numeric value graphic object P12 and the unit graphic object P13. The bar chart object P14 is a dynamic graphics. The digital manipulator 3 continuously retrieves real-time numeric value when the image I is displayed. Furthermore, the display length of the bar chart object P14 is dynamically adjusted according to the real-time numeric value and the image I generate dynamic changes.

It should be noted that, dynamic graphics (for example, the numeric value graphic object P12 and the bar chart object P14) in the image I are provided by editing software 4. Furthermore, the digital manipulator 3 also supports dynamic graphics. The users edit the image I by configuring types of dynamic graphics. The digital manipulator 3 retrieves the real-time numeric value of the inverter (such as current values or frequency variations) retrieving after the inverter is powered on. Furthermore the dynamic graphics is adjusted to generate correspond changes based on the real-time numeric value.

Figure 6:
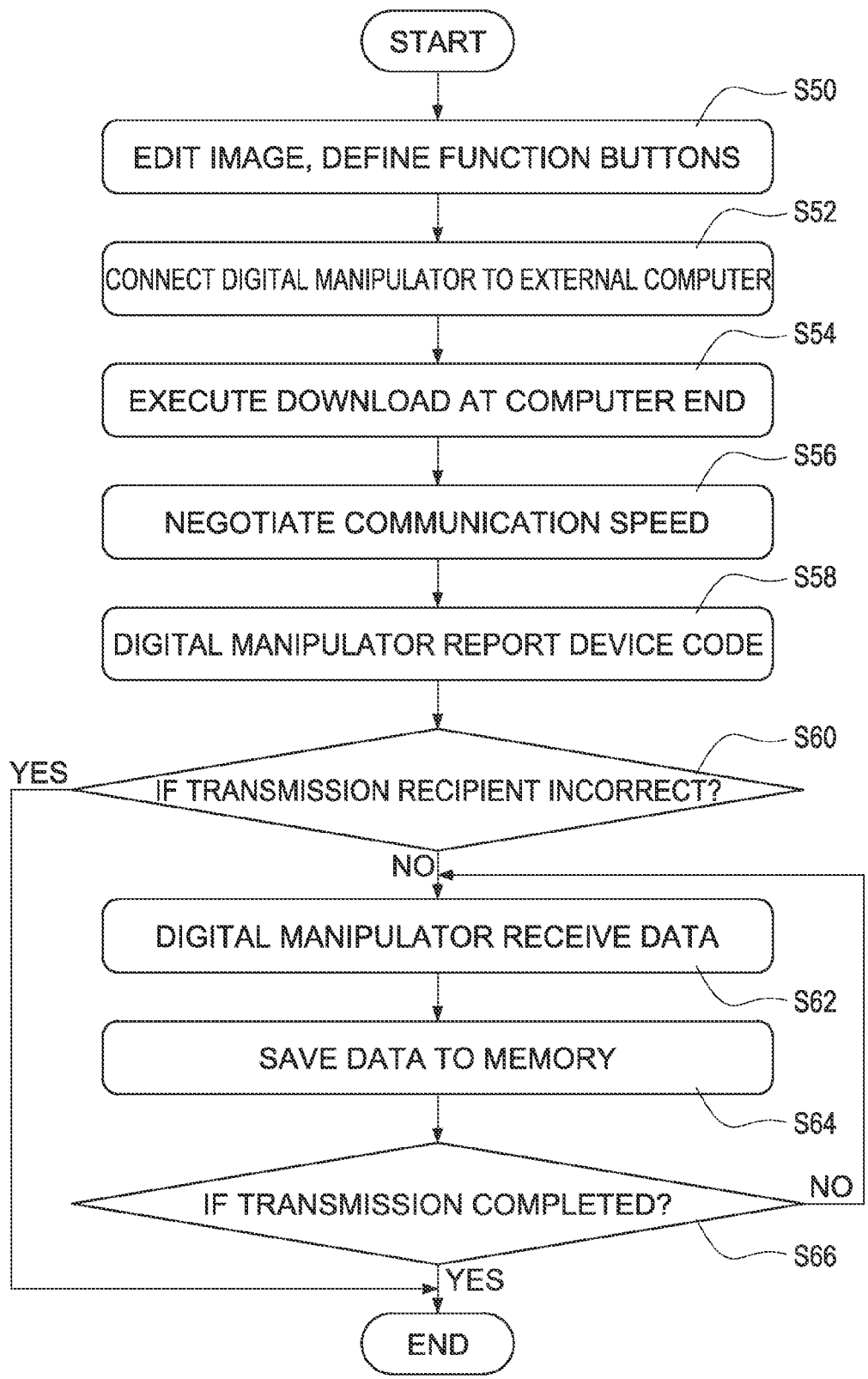
FIG. 6 is a download flow chart of a preferred embodiment according to the present invention.

Next, FIG. 6 is a download flow chart of a preferred embodiment according to the present invention. Firstly, an image I is edited and functions of function buttons 33 are configured with an external computer 40 via above-mentioned editing software 4 (step S50). Next, the digital manipulator 3 is connected to the external computer 40 (step S52), Furthermore, the external computer 40 perform download (step S54). Following the step S54, the digital manipulator 3 negotiates transmission speed with the external computer 40 (step S56). Furthermore, the digital manipulator 3 reports a device code to the digital manipulator 3 the external computer 40 (step S58). The external computer 40 determines if the transmission recipient is incorrect according to the device code (step S60), if yes, the transmission is canceled.

Following the step S60, if the transmission recipient is determined correct, then the digital manipulator 3 starts receiving data transmitted from the external computer 40 (S62). Next, the transmitted data is saved to the memory 35 in the digital manipulator 3 (step S64). After the saving step is completed, the digital manipulator 3 determines if the data transmission is completed (step S66, if not, the flow returns to the step S62 and the digital manipulator 3 continues to receive data, and if yes the data transmission is cancelled.

Figure 7:
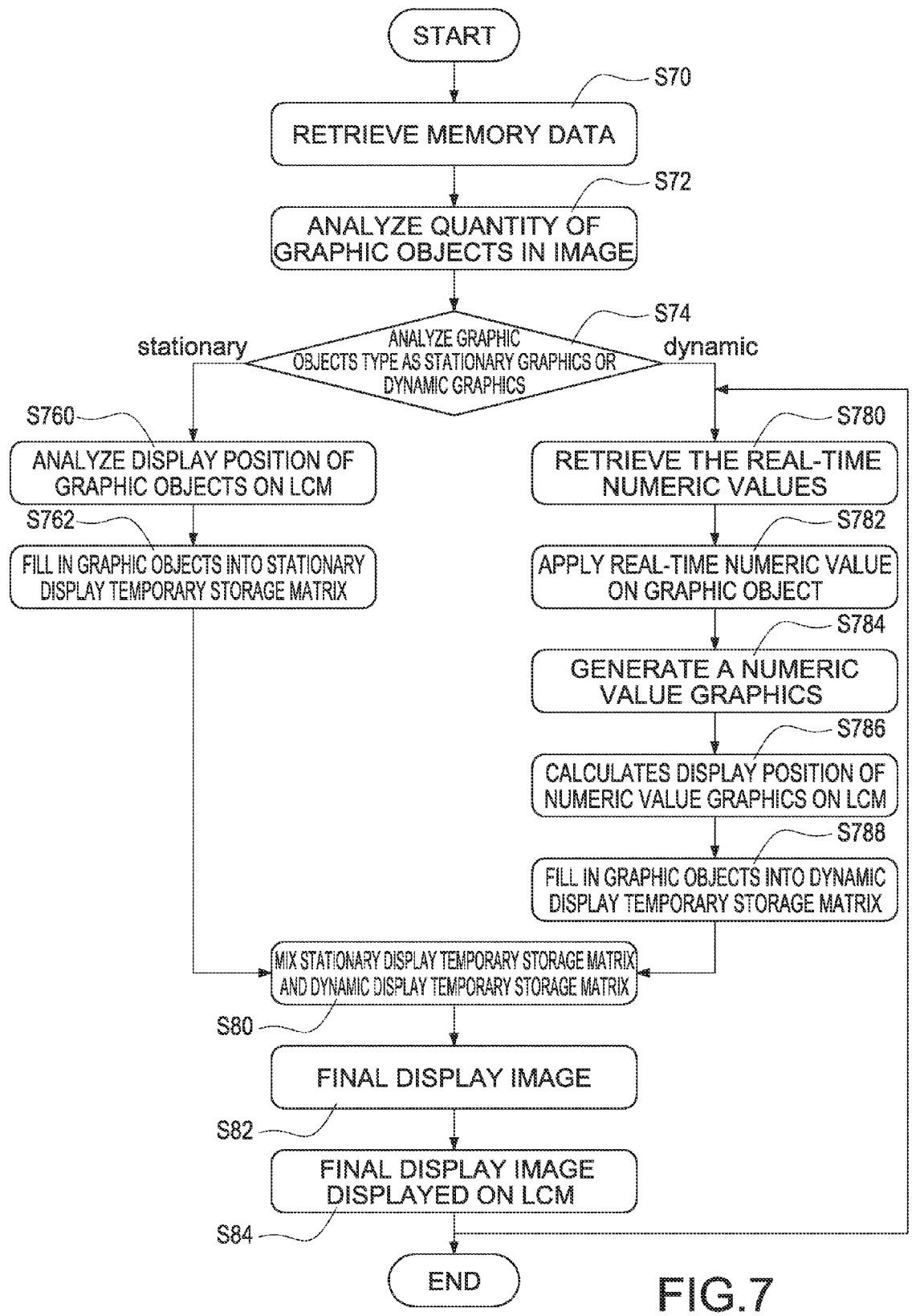
FIG. 7 is an image display flow chart of a preferred embodiment according to the present invention.

Lastly, FIG. 7 is an image display flow chart of a preferred embodiment according to the present invention. Firstly, the digital manipulator 3 retrieves data in the memory 35 (step S70). Next, the quantity of the graphic object P1 in the image I is analyzed (step S72). In other words, the step is used for determining how many graphic objects P1 all together constitute the image I. Following the quantity of the graphic objects P1 is determined, the digital manipulator 3 respectively analyzes types of each graphic object P1 as stationary graphics or dynamic graphics (step S74).

In the step S74, if one of the graphic objects P1 is a stationary graphics, then the digital manipulator 3 calculates the display position of the graphic object P1 on the LCM 31 (step S760). Furthermore, the graphic object P1 is filled into a stationary display temporary storage matrix of the digital manipulator 3 (not shown in the diagram) (step S762). It should be noted that, when the editing software 4 edits the graphic objects P1 in the image I, the calculation starts from coordinates (0,0). Accordingly, it is required to calculate actual coordinates of the graphic objects P1 in order to putting the graphic objects P1 on correct positions in the image I. The matrix space of the stationary display temporary storage matrix is as large as the display size of the LCM 31. As a result, calculating display positions of the graphic objects P1 (stationary graphics in the embodiment) on the LCM 31 is calculating actual coordinates of the graphic object P1 in the stationary display temporary storage matrix.

In the step S74, if one of the graphic objects P1 is a dynamic graphics, then the digital manipulator 3 retrieves the real-time numeric values of the inverter according to the predetermined communication address (step S780). Furthermore, the digital manipulator 3 applies the real-time numeric value on the graphic object P1 (step S782). As a result, the status of the graphic object P1 is modified such that the graphic object P1 corresponds to the real-time numeric value of the inverter for generating a numeric value graphics (step S784). Next, the digital manipulator 3 calculates display position of the numeric value graphics on the LCM 31 (step S786). Furthermore, the numeric value graphics is filled into a dynamic display temporary storage matrix (not shown in diagrams) of the digital manipulator 3 (step S788). Identical with the matrix space of the temporary storage matrix of the stationary display, the dynamic display temporary storage matrix is as large as the display size of the LCM 31. As a result, calculating display position of the numeric value graphics on the LCM 31 is calculating actual coordinates of the numeric value graphics in the dynamic display temporary storage matrix.

Finally, when the graphic objects P1 of the stationary graphics type are all filled into the stationary display temporary storage matrix, and the graphic objects P1 of the dynamic graphics type (i.e. the numeric value graphics) are all filled into the dynamic display temporary storage matrix, the digital manipulator 3 mixes the stationary display temporary storage matrix and the dynamic display temporary storage matrix (step S80). Next, the final display image is generated based on the mixed result (step S82). Furthermore, the final display image is displayed on the LCM 31 (step S84).

Following the step S84, if the image I has the graphic objects P1 of the dynamic graphics type, then the step S780 to the step S84 are repeated periodically before the inverter or the digital manipulator 3 is powered off. The digital manipulator 3 periodically retrieves the real-time numeric values of the inverter to continuously and dynamically update the numeric value graphics and the dynamic display temporary storage matrix. Furthermore, the final display image is dynamically changed based on the updated dynamic display temporary storage matrix. Furthermore, the updated display image is displayed. In FIG. 5A, the numeric value graphic components P12 dynamically change along with the real-time numeric values of the inverter. In addition, in FIG. 5B, length of the bar chart object P14 dynamically changes along with the real-time numeric values of the inverter.

As the skilled person will appreciate, various changes and modifications can be made to the described embodiments. It is intended to include all such variations, modifications and equivalents which fall within the scope of the invention, as defined in the accompanying claims.

What is claimed is:

1. An image display method for a digital manipulator of an inverter, the digital manipulator electrically connected to an inverter and an external computer, an image being edited by editing software in the external computer, and being download to the digital manipulator to display, the image display method comprising:
- a) analyzing quantity of graphic objects constituting the image by a micro controller unit (MCU) of the digital manipulator;
- b) analyzing types each graphic object as stationary graphics or dynamic graphics by the MCU;
- c) providing a stationary display temporary storage matrix at the digital manipulator, and filling the graphic object of a stationary graphics type into the stationary display temporary storage matrix;
- d) providing a dynamic display temporary storage matrix at the digital manipulator, and filling the graphic object of a dynamic graphics into the dynamic display temporary storage matrix; and
- e) mixing the stationary display temporary storage matrix and the dynamic display temporary storage matrix at the digital manipulator for generating a final display image.

2. The image display method of claim 1, wherein further comprising:
- f) providing a liquid crystal module (LCM) at the digital manipulator for displaying the final display image.

3. The image display method of claim 2, wherein the step c further comprising:
- c11) calculating at the digital manipulator the display position of the graphic object on the LCM if the graphic object is a stationary graphics following step b; and
- c12) filling the graphic object into the stationary display temporary storage matrix by the digital manipulator.

4. The image display method of claim 3, wherein the actual coordinates of the graphic object in the stationary display temporary storage matrix are calculated by the digital manipulator in the step c11.

5. The image display method of claim 1, wherein the step d further comprising:
- d11) retrieving the inverter a real-time numeric value by the digital manipulator based on a predetermined communication address if the graphic object is a dynamic graphics following step b;
- d12) applying the real-time numeric value on the graphic object for generating a numeric value graphics by the digital manipulator;
- d13) calculating the display position of the numeric value graphics displayed on the LCM by the digital manipulator;
- d14) filling in the numeric value graphics into the dynamic display temporary storage matrix by the digital manipulator.

6. The image display method of claim 5, wherein the actual coordinates of the numeric value graphics in the dynamic display temporary storage matrix are calculated by the digital manipulator the step d13.

7. The image display method of claim 5, wherein the method further comprises steps before the inverter or the digital manipulator are powered off:
- g) repeating executing the step d11 to the step d14 at the digital manipulator following the step e; and
- h) repeating executing the step e at the digital manipulator following the step d14.

8. The image display method of claim 3, wherein the temporary storage matrix of the stationary display has matrix space as large as the display size of the LCM.

9. The image display method of claim 5, wherein the temporary storage matrix of the dynamic display has matrix space as large as the display size of the LCM.

* * * * *